United States Patent Office 3,558,273
Patented Jan. 26, 1971

3,558,273
PREPARATION OF TITANIUM
PHOSPHATE PLATELETS
Henry N. Beck, Walnut Creek, Calif., assignor to The Dow Chemical Company, Midland, Mich., a corporation of Delaware
No Drawing. Continuation-in-part of application Ser. No. 632,933, Apr. 24, 1967. This application Mar. 5, 1969, Ser. No. 812,528
Int. Cl. C01b 25/00; C08k 1/02
U.S. Cl. 23—105                 10 Claims

ABSTRACT OF THE DISCLOSURE

The present invention relates to a novel titanium phosphate product of thin platelet configuration and to preparation of the plates by reacting, in the presence of water; a titanium source material and a phosphate source material under controlled reaction conditions.

BACKGROUND OF THE INVENTION

This application is continuation-in-part of application Ser. No. 632,933 by Henry N. Beck, filed Apr. 24, 1967, now abandoned.

This invention relates to inorganic phosphates and more particularly is concerned with a novel crystalline six-sided platelet form of titanium phosphate and to a process for its preparation.

French Pat. 1,355,809 teaches the preparation of a titanium pyrophosphate material suitable for use as a pigment. More specifically in accordance with the teachings of this patent, aqueous solutions of titanium tetrachloride and phosphoric acid are mixed and the resulting precipitate heated at from 750–1100° C., after the optional addition of from 0.1 to about 2.0 weight percent potassium phosphate, to produce a calcined titanium pyrophosphate pigment material corresponding to the empirical formula $TiP_2O_7$.

A hydrated, substantially impurity free basic titanic phosphate was reported to be precipitated in a granular, readily filterable and washable form by gradually adding, with mixing, a solution of phosphoric acid or an aqueous soluble phosphate to a solution of a titanium sulfate or chloride (U.S. 1,876,065). To obtain the granular product of this patented process careful control of titanium reactants, excess of free acid and the presence of chlorides all were indicated to be necessary.

Clearfield and Stynes, J. Inorg. Nucl. Chem., 1964, vol. 26, pp. 117–129, reported the stoichiometry and dehydration behavior of a gelatinous zirconium phosphate. In this study, the reaction of an excess of phosphoric acid or soluble phosphate when added to a soluble zirconium salt was indicated to produce a gelatinous product which upon refluxing in phosphoric acid formed crystals which had approximately the same composition as the gels but exhibited a somewhat different dehydration behavior.

Additionally, it is known in the art that whiskers or other elongated acicular inorganic crystalline materials, such as refractory metal carbides, silicon carbide, aluminum oxide, etc. are suitable and effective for reinforcing polymers, metals and other structural materials. Inorganic whiskers available heretofore and the methods of their preparation used to date, however, are quite expensive and not generally commercially applicable.

Nowhere has it been known or suggested in the prior art to prepare crystalline six-sided plates of titanium phosphate.

Now, unexpectedly, we have discovered a novel titanium phosphate in a unique and useful platelet, generally hexagonal, crystalline form.

It is a principal object of the present invention to prepare a novel six-sided platelet form of titanium phosphate.

It is also an object of the present invention to provide a novel, simple, and relatively inexpensive process for preparing small platelets of titanium phosphate.

It is a further object of the present invention to provide a novel titanium phosphate product suitable for use as (a) a reinforcing medium in plastics and other structural materials, (b) a pigment component for paints and paper coatings, (c) fluid viscosity controls, (d) ion exchange medium and (e) protector of polymers, paints, etc., against ultra-violet radiation.

These and other objects and advantages readily will become apparent from the detailed description presented hereinafter.

SUMMARY

In general, the proces of the present invention comprises mixing a titanium source material and an aqueous solution of orthophosphoric acid or water soluble inorganic phosphates in controlled amounts to provide an aqueous reaction mixture having a pH of less than 7. The reaction mixture is heated at a predetermined temperature within a range about 100° to about 400° C. for a period of at least about 15 minutes, under at least, and preferably at, its autogeneous pressure, thereby to prepare thin, six-sided plates of titanium phosphate having a Ti/P molar ratio of from about 0.3 to about 0.95. The titanium source material is selected from titanium containing salts, oxides, metalloorganics and the like materials which are either soluble in and/or react with the aqueous phosphate solution employed. Orthophosphoric acid is usually employed as the phosphate source material. The molar ratios of titanium source material and phosphate to be employed, expressed as $PO_4 \equiv /Ti^{+4}$ range from about 1 to about 35.

By following this process, the crystalline hexagonal plates of titanium phosphate form directly in the reaction mass.

Unexpectedly, it has been found, by controlling the reactant source materials, reactant concentrations, nucleating and reaction temperatures to certain specific ranges within the operable onditions set forth hereinbefore that three different sizes of plates reproducibly can be prepared. These are: (1) a small hexagonal platelet having substantially equal length sides and averaging about 0.5 micron in diameter; (2) an intermediate hexagonal platelet having sides of substantially equal lengths and ranging from about 10 to about 15 microns in diameter; and (3) a relatively large elongated hexagonal plate having two parallel sides with a long dimension averaging about 20 microns in length. In these large platelets, the two terminal angles are 90°; the other four angles are 135°. The large plates show a larger distribution of sizes than the small and intermediate platelets. Each of these different sized particles generally are less than about 5 microns in thickness.

The term "diameter" as used herein with respect to the small and intermediate hexagonal plates is defined as the distance across the plate between two parallel side edges.

DESCRIPTION OF THE PREFERRED EMBODIMENT

Usually in the practice of the present invention, the titanium source material, either as an aqueous solution or in solid particulate form, depending on the particular platelet size desired, is placed in a pressurizable reactor along with the orthophosphoric acid and water, if required to provide the desired concentration, and the resulting reaction mixture heated within a controlled temperature range for from about 15 minutes to two hours or more.

PREPARATION OF SMALL HEXAGONAL PLATELETS

In the actual preparation of the small hexagonal titanium phosphate platelets, a titanium source material which is soluble in aqueous orthophosphoric acid is admixed with the phosphate material, which may be either orthophosphoric acid or an inorganic phosphate. The quantities employed are such to provide an aqueous reaction mixture having an initial titanium concentration, expressed as titanium ion, of from about 0.125 to about 1 molar, preferably from about 0.25 to about 0.75 molar and a phosphate concentration, expressed as $PO_4\equiv$ion, of of from about 3 to about 5 molar, preferably about 4 molar. The pH of this mixture is lower than about 7. Preferably aqueous soluble forms of titanium are employed including, for example, titanyl chloride ($TiOCl_2$), titanyl sulfate ($TiOSO_4$) and titanium tetrachloride ($TiCl_4$). Uncalcined titanium dioxide, hydrous titanium oxides, amorphous or crystalline titanium phosphates and the like may be used in some instances. Orthophosphoric acid usually is employed as the phosphate source. This, of course, can be produced in situ by reacing phosphate salts with a strong mineral acid.

The resulting reaction mass is heated under its autogenous pressure at a temperature of from about 100 to about 225° C. for a period of at least about 15 minutes and usually at from about 15 minutes to about 5 hours. Ordinarily the process is carried out at a temperature of about 150° C. for a period of about 2 hours. During this reaction period, titanium phosphate hexagonal platelets having a diameter of about 0.5 micron and a thickness of from about 0.1 to about 0.2 micron form directly in the reaction mass.

Following the reaction period, the solid titanium phosphate platelets are separated from the aqueous residual liquid reaction mixture. Usually, these are removed by filtration. If desired, they can be washed with water, e.g., and dried either at room temperature or an elevated temperature, for example, 110–120° C.

Elemental analysis of the platelets are consistent for a product corresponding to the empirical formula $$TiO_2 \cdot P_2O_5 \cdot 2H_2O$$

and having a structure corresponding to 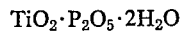.

The platelets undergo endothermic transitions at from about 250–300° C. and at about 500° C. with about 6–7 percent weight loss at each transition. The crystal morphology is retained through both of these transitions. An exothermic change at about 870° C. results in loss of the crystal morphology with formation of irregular masses of material shown by analysis to consist of from about 90 to 95 percent titanium pyrophosphate ($TiP_2O_7$).

As prepared, the platelets are acidic in nature. Titration with aqueous alkali of the product reveals two acidic hydrogens at about pH 4.4 and 8.5, respectively, with equivalent weight of 251 (first hydrogen) and 259 (second hydrogen). The calculated equivalent weight for a product consistent with the assigned structure is 258. The ratio of the equivalent weights calculated from the second and first hydrogen is about 1.

PREPARATION OF INTERMEDIATE HEXAGONAL PLATELETS

The intermediate-size platelets are prepared by reacting a substantially aqueous-insoluble finely divided titanium source material, preferably anatase or rutile titanium dioxide, with an acidic aqueous phosphate solution, usually orthophosphoric acid, at a temperature of from about 150 to about 225° C., preferably from about 175 to about 200° C. for a period of from about 1 to about 5 hours and usually about 2 hours.

Concentration of the titanium source material in the initial reaction mixture, expressed as titanium ion, ranges from about 0.25 to about 1 molar, and that of the phosphoric acid, expressed as phosphate ion, ranges from about 3 to about 4.5 molar, preferably about 4.

In the preparation of the intermediate sized platelet, a finely divided nucleating agent or seed material must be employed to assure the formation of the hexagonal plates of predetermined size. If a nucleating agent is not used, the product material is produced in the form of the small hexagonal platelets or irregular, broken crystals similar in appearance to finely ground glass. Materials found to be particularly suitable for use as nucleating agents are finely divided sized particles of fibrous titanium phosphate produced by the process described in patent application, Ser. No. 804,671, filed Mar. 5, 1969, as well as the small sized titanium phosphate plates described hereinbefore. Also, small quantities of intermediate sized platelets themselves have been found to be satisfactory for use as "seed." The quantity of seed material to be employed ranges from about 0.125 to about 1.0 weight percent, based on the calculated total of titanium phosphate intermediate platelet product expected. The preferred concentration of nucleating agent is about 0.5%. The size of the seed material usually ranges from about 0.5 to about 100 microns in its longest dimension.

The intermediate sized platelets are in the form of very thin hexagonals having a diameter of from about 10 to about 15 microns.

Intermediate platelets prepared at a temperature below about 200° C. are found to lose about one molecule of water at from about 250 to about 400° C. and another at about 600° C. corresponding to a weight loss of about 6.9 and 12.1 percent, respectively. Platelets produced at about 225° C. were found to undergo 14.2 percent weight loss at 850° C. Infrared spectra of intermediate platelets prepared at a maximum temperature of about 200° C. indicate the product to be a titanium phosphate hydrate while the product prepared at about 225° C. was shown apparently to be less hydrated.

Titration with aqueous sodium hydroxide gave two acidic hydrogens one each at pH of from about 5–5.2, the other at from about 8.5–8.8. Depending upon the temperatures of preparation, the equivalent weight was found to be about 256–261 (preparation temperature of from about 175–200° C.) or about 235 (preparation temperature about 225° C.). The ratio of the equivalent weights calculated from the first and second hydrogen ranges from about 1.9–2.1.

PREPARATION OF LARGE SIZE SIX-SIDED PLATELETS

The large size platelets are prepared by reacting an aqueous solution of orthophosphoric acid or of a soluble inorganic phosphate at a molar concentration of from about 5 to about 8, and preferably of from about 5 to about 6, with either a water soluble or water insoluble titanium source material such as anatase, rutile, titanium tetrachloride, titanyl chloride, titanyl sulfate amorphous or crystalline titanium phosphates and the like. The concentration of titanium source material, expressed as titanium ion, in the initial aqueous reaction mixture ranges from about 0.125 to about 1 molar and preferably from about 0.25 to about 0.5 molar. The reaction mixture is heated under at least its autogeneous pressure at a temperature of from about 300 to about 400° C., preferably at about 350–400° C. for a period of from 1 to 24 hours, and preferably for at least 2 hours. The large size elongated, six-sided thin plates having two substantially parallel long sides averaging about 50 microns in length and four shorter sides averaging about 20 microns in length and being about less than 5 microns thick form directly in the reaction mixture. The two terminal angles of the plates are 90°, and the other four are 135°.

The large plates contain two acidic hydrogens the first of which can be titrated with aqueous sodium hydroxide at about pH 5.1 and the second at about 7.7. The plates exhibit an equivalent weight of from about 2400 to 11,000 (first hydrogen). The ratio of the more acidic proton to the less acidic proton is from about 2.5–8.1. Infrared spectra of the plates revealed no detectable hydroxyl (OH) groups.

Heating the large platelets produced only about 2.6 percent weight loss which occurred at about 820° C. during an exothermic transition.

All three sizes of platelets are prepared in an aqueous reaction medium having a pH of less than 7 and preferably at a maximum pH of about 1.

Although usualy the process is carried out under the autogeneous reaction pressure, the reaction can be carried out at higher pressures than autogeneous.

The crystalline product, after separation from the aqueous reaction mass, usualy is washed and then dried. Conveniently, the crystals are dried at an elevated temperature below that where water of crystallization is lost. Temperatures of from about 100 to about 110° C. are preferred. Longer drying times are required, but satisfactory drying is achieved at room temperatures.

Titration of the platelets usually is carried out at room temperature in ½ molar aqueous sodium chloride solution using 30-second intervals between additions of aliquots of dilute aqueous sodium hydroxide solution and the reading of the resulting pH. [This analytical technique is similar to that applied to ion exchange resins by H. P. Gregor and J. I. Bregman, J. Am. Chem. Soc., 70, 2370 (1948)].

Titanium source materials suitable for use in preparing the platelet product can be any of a variety of titanium containing source materials which will dissolve in and/or react with the phosphate source material in the aqueous reaction mixture under the conditions set forth hereinbefore for preparing a predetermined size plate. Titanyl chloride ($TiOCl_2$), titanium dioxide ($TiO_2$), organotitanium compounds, such as tetraalkyl titanate corresponding to the formula $(RO)_4Ti$ where R is an aliphatic hydrocarbon group having a carbon chain length of from about 1 to about 10, and the like have been found to be suitable for use as titanium source materials in the practice of the present invention. A convenient soluble titanium source material is a titanyl chloride solution containing from about 180 to about 200 grams/liter titanium which readily is produced by evaporation of a substantially iron free, highly acidic (8 molar HCl) solution containing from about 40 to about 50 grams/liter titanium. (The leach solution readily can be obtained by hydrochloric acid leach of acid soluble titanium ore.) The ratio of Cl/Ti ions in this concentrate is about 2.2 indicating a composition having an empirical formula corresponding approximately to $TiOCl_2$.

Nucleating agents or seed as employed in the preparation of the intermediate size plates can be selected from any of a variety of finely divided materials which will act as nucleation sites. Small particles of titanium phosphate itself either as prepared or ground, the hexagonal platelets of titanium phosphate as set forth herein, and the like materials can be incorporated into the reaction mixture within the disclosed concentration ranges. Usually, seed material, if it is used, is in a finely divided state and is crystalline in nature.

The process can be carried out using batch, cyclic batch, or continuous operations. The reactor processing equipment and the like to be employed can be fabricated from any of a variety of structural materials which will withstand the operating temperatures and reaction conditions. Glass lined steel reactors, tantalum vessels and the like, have been found to be suitable for carrying out the present process.

The hexagonal titanium phosphate plates of the present invention find utility as a reinforcing medium in polymers and other structural materials. They also can be used as a pigment component for paints and paper coating as well as a light stabilizer. In this latter use because of their unusually high reflectance of incidence light well into the ultraviolet region of the spectrum, they offer an advantage in coatings over conventional pigment materials. Additionally, the present novel crystalline titanium phosphate plates can be used as fluid viscosity controls, ion exchange medium and in other applications.

The following examples will serve to further illustrate the present invention but are not meant to limit it thereto.

PREPARATION OF SMALL, HEXAGONAL TITANIUM PHOSPHATE PLATES

Example 1

A mixture of 1.6 milliliters of an aqueous titanyl chloride solution ($\sim 6.3 \times 10^{-3}$ mole Ti), 7.0 milliliters of 85% syrupy orthophosphoric acid ($\sim 0.1$ mole $PO_4\equiv$) and 16.4 milliliters of distilled water was sealed in a thick wall glass ampoule reactor. The reactor had a capacity of about 50 milliliters and was about 19 centimeters long with about 2.5 centimeters outside diameter. The actual concentration of the reactants in the resulting mixture was titanium, 0.25 molar and phosphate, 4 molar.

The reactor and its contents were heated and agitated at 150° C. for 2 hours followed by slow cooling to ambient temperature over a three-hour period. The product mixture was removed from the reactor; the solids were separated from the residual liquid by filtration and washed with water until the pH of the filtrate was about 6. The resulting finely divided particulate solid product was dried overnight ($\sim 18$ hours) at about 58° C. at an absolute pressure of about 1–2 millimeters mercury. The product yield was 1.43 grams which is about 88 percent of theoretical.

Examination of the product by electron microscope at a magnification of 27,000× showed this material to be substantially uniform, hexagonal, plates ranging from about 0.25 to 0.5 micron in diameter. They also were found to be from about 0.1 to 0.2 micron thick.

Analysis by neutron activation technique showed titanium, 18.5±0.5%, and phosphorus, 25.6±0.6% indicating a Ti/P molar ratio of about 0.47. Calculated analysis for a product corresponding to the empirical formula $TiO_2 \cdot P_2O_5 \cdot 2H_2O$ is Ti—18.6%; P—24.0%; $H_2O$—13.98%.

Heating the platelets to predetermined temperatures gave the following weight losses: 300° C.—7.8%; 500° C.—13.2%; 570° C.—13.4%; 850° C.—13.9%; 910° C.—14.5%. Endotherms were observed over the range of from about 250–300° C. and at 500° C.; an exotherm was observed at about 860° C.

The infrared spectrum of the platelets showed the existence of a hydrate which disappeared upon heating to about 300° C. This is substantiated by the weight loss data.

A slurry of the platelets in 0.5 molar aqueous sodium chloride was agitated overnight. Titration of the slurry with dilute aqueous sodium hydroxide, following the procedure set forth hereinbefore, showed two acidic hydrogens, one at pH 4.6 and the other at pH 8.7 with corresponding equivalent weights of 251.1 and 258.9.

This procedure was repeated with a second batch of reactants. Plates of the same type and size as in the first run were recovered.

Example 2

A mixture of 2300 ml. of an aqueous titanyl sulfate solution (26 grams Ti/liter), 1350 ml. of 85% syrupy orthophosphoric acid, and 1350 ml. of distilled water was sealed in a two-gallon-capacity, glass-lined Pfaudler kettle. The concentration of the reactants in the resulting mixture was titanium, 0.25 molar, and phosphate, 4 molar.

The kettle and its contents were heated without agitation at 156° C. and 80 p.s.i. for two hours followed by slow cooling over a three-and-one-half period to ambient temperature. The product mixture was removed from the kettle and the solids separated by filtration. The particulate solid product mass was washed with water until the pH of the filtrate was about 3.8 and no sulfur or sulfate was found in the filtrate. The resulting finely divided particulate solid was dried overnight at 92° C. The yield of white product was 389 grams.

Examination of the product by electron microscope at a magnification of 13,000× showed this material to be substantially uniform, hexagonal, platelets ranging from about 0.4 to 0.7 micron in diameter and having a thickness of from about 0.1–0.2 micron.

Analysis by neutron activation technique showed titanium, 19.5±0.6%, and phosphorus, 24.8±0.7%, indicating a Ti/P molar ratio of about 0.51.

After being heated at 500° C. for two hours, the resulting product showed 22.6±0.7% titanium and 28.9±0.9% phosphorus, indicating a Ti/P molar ratio of about 0.51. After heating at 850° C. for two hours, the resulting product analyzed at 20.9±0.6% titanium and 23.3±0.7% phosphorus, indicating a Ti/P molar ratio of about 0.58.

Differential thermal analysis of the titanium phosphate platelets showed endothermic transitions at about 321° C. and about 531° C. An exothermic transition occurred at about 902° C. Thermogravimetric analysis showed weight losses of about 7.3% at about 335° C. and about 13.6% at about 565° C.

The infrared spectrum of the platelets revealed the presence of OH and a hydrate as shown by absorption bands at about 2.8, 2.9, and 6.2 microns.

PREPARATION OF INTERMEDIATE SIZE TITANIUM PHOSPHATE PLATES

Example 3

A mixture of about 2 grams anatase $TiO_2$, 25 milliliters of 4 molar orthophosphoric acid and about 24 milligrams of titanium phosphate fibers (about 5–15 microns long and 0.3 micron in cross-sectional diameter) as seed was sealed in a heavy wall glass ampoule of the same type as used in Example 1. The concentration of reactants in the initial aqueous mixture was titanium, 1 molar, and phosphate, 4 molar. The ampoule was heated with agitation at a temperature of about 196° C. for 2 hours after which it was cooled over a period of about 1¼ hours to room temperature. The product mixture was removed from the reactor, the solids separated by filtration, and these washed with distilled water until the pH of the resulting wash filtrate was about 4.6. The resulting particulate solid product was dried at about 99° C. under an absolute pressure of about 1–2 millimeters mercury for two days. Product yield was 5.21 grams which is about 80.8 percent of theoretical.

Examination of the product by light microscope at a magnification of 450× to 2450× showed this material to be substantially uniform, thin, hexagonal plates ranging from about 9 to about 14 microns in diameter.

Analysis of the platelets by neutron activation techniques gave Ti—21.5±0.6%; P—22.9±0.6% for a Ti/P molar ratio of about 0.6

The infrared spectrum indicates that the product is a hydrate. This was confirmed by heating tests which indicate loss of water in two discrete endotherms, one at about 400° C. (6.6 percent water loss) and the other at about 580° C. (11.7 percent water loss).

Titration of a slurry of the platelets in 0.5 molar aqueous sodium chloride with dilute aqueous sodium hydroxide revealed two acidic hydrogens. One was at about pH 5.1 and the other at about 8.5; the corresponding equivalent weights were 267 and 482.

Example 4

Following the procedure described in Example 3, a mixture of about 1.5 grams anatase $TiO_2$, 25 ml. of 4 molar orthophosphoric acid and about 18 milligrams of titanium phosphate fibers (about 5–15 microns long and about 0.3 micron in cross-sectional diameter) as nucleating agent was sealed in a heavy wall glass ampoule reactor. This provided an aqueous reaction mixture having an initial concentration of titanium, 0.75 molar, and phosphate, 4 molar. The reactor was heated with agitation at a temperature of about 174° C. for two hours after which it was cooled over a period of about 1⅓ hours to ambient temperature. The product mixture was removed from the ampoule, the solids separated by filtration, and these washed with distilled water until the pH of the resulting wash filtrate was about 4.5. The resulting particulate solid product was dried at about 100° C. under an absolute pressure of about 1–2 millimeters of mercury for about 72 hours. The yield of white product was 3.47 g.

Examination of the product by light microscopy at a magnification of 450× revealed that this material was substantially uniform, thin, hexagonal plates ranging from about 8 to about 13 microns in diameter.

Analysis of the platelets by neutron activation techniques gave 25.7±0.6% titanium and 20.0±0.5% phosphorus for a Ti/P molar ratio of about 0.83.

Example 5

Following the procedure described in Example 3, a mixture of about 1 gram of rutile titanium dioxide, 25 milliliters of 4 M orthophosphoric acid, and about 12 milligrams of titanium phosphate fibers (about 5–15 microns long and about 0.3 micron in cross-sectional diameter) as nucleating agent were sealed in a heavy wall glass ampoule reactor. This provided an aqueous reaction mixture having an initial concentration of titanium, 0.5 molar, and phosphate, 4 molar. The reactor was heated and agitated at a temperature of about 225° C. for two hours after which it was cooled to ambient temperature over a period of about 3¼ hours. The product mixture was removed from the ampoule, the solids separated by filtration, and these washed with distilled water until the pH of the resulting wash filtrate was 3.9. The resulting particulate solid was dried at about 105° C. under an absolute pressure of about 1–2 millimeters of mercury for about 72 hours. The yield of white solid was 2.30 g.

Examination of the product by light microscopy at a magnification of 450× showed this material to be substantially uniform, thin, hexagonal platelets ranging from about 7 to about 17 microns in diameter.

Analysis of the platelets by neutron activation analysis showed the presence of titanium, 23.8±0.6%, and phosphorus, 19.9±0.5%, for a Ti/P molar ratio of 0.78.

Example 6

A mixture of 5391 grams of anatase $TiO_2$, 24,588 ml. of 85% syrupy orthophosphoric acid, 65,412 ml. of distilled water, and 66 grams of titanium phosphate fibers (about 5–15 microns long and about 0.2–0.3 micron in cross-sectional diameter) was sealed in a 30 gallon capacity glass-lined Pfaudler kettle. The initial concentration of the reactants in the aqueous reaction mixture was titanium, 0.75 molar, and phosphate, 4.19 molar.

The kettle and its contents were heated with stirring at a temperature of 185–190° C. and 185–195 p.s.i. pressure for two hours followed by slow cooling to ambient temperature over a period of 19½ hours. The product mixture was removed from the kettle, the solids were separated from the residual aqueous liquid by filtration, and washed with water until the pH of the filtrate was 3.3–3.7. The original residual liquid filtrate contained phosphate, 3.15 molar, indicating that the solid product had a Ti/P molar ratio of 0.72. The resulting finely divided particulate solid was dried for about 60 hours at about 113° C. The yield of white platelets was 31.12 lbs.

Examination of the product by light microscopy at a magnification of 450× showed that this material to be substantially uniform, thin, hexagonal platelets ranging from about 8 to about 15 microns in diameter.

Samples of the platelets lost 7.1 and 6.9% weight after heating for one hour in an oven at 500° C. the platelets lost 12.5 and 11.9% weight after heating for one hour in an oven at 850° C.

Titration of a slurry of the platelets in 0.5 molar aqueous sodium chloride with dilute aqueous sodium hydroxide revealed four acidic hydrogens at pH of about 4.1, 5.4, 6.6, and 9.3. The breaks in the titration curves corresponded to a reaction of 3.25, 4.06, 4.99, and 6.67 meq. NaOH/g. platelets respectively.

PREPARATION OF LARGE TITANIUM PHOSPHATE PLATES

Example 7

Following the procedure described in Example 3, a mixture of 1 gram anatase $TiO_2$ and 25 milliliters of 4 wall molar aqueous orthophosphoric acid was sealed in a heavy glass ampoule reactor. This provided an aqueous reaction mixture having an initial concentration of titanium, 0.5 molar, and phosphate, 4 molar. The sealed reactor was heated with agitation at about 350° C. for about 2 hours. After the reaction period the reactor was slowly cooled to room temperature. The product mixture was removed from the reactor, the solids separated by filtration and washed with distilled water until the pH of the wash filtrate was about 4.3. The resulting particulate product after drying at about 100° C. under an absolute pressure of about 1–2 millimeters mercury was found to be free flowing. The product yield was about 2.3 grams; i.e., a yield of about 89.4% based on starting materials.

Examination of the product particle by light microscope at a magnification of 450× to 2450× showed the product to be substantially elongated, six sided, thin platelets. The two long sides ranged from about 25 to about 90 microns, averaging about 70 microns and the short sides ranged from about 10 to about 30 microns in length, averaging about 20 microns. The plates were about 1–4 microns thick. The two terminal angles on all plates were 90°; the other four angles were 135°.

Elemental analysis, by neutron activation technique, showed Ti—23.3±0.7%; P—28.5±0.9% indicating a Ti/P molar ratio of about 0.53.

Infrared analysis indicated an absence of —OH groups. Thermogravimetric Analysis and Differential Thermal Analysis both showed only an exothermic transition at about 820° C. which was accompanied by a 2.6 percent weight loss.

Titration of a slurry of the platelets in 0.5 molar aqueous sodium chloride with dilute aqueous sodium hydroxide revealed two acidic hydrogens, one at about pH 5.3 and the other at pH 7.7. Correspondingly, the equivalent weights were found to be 2408 and 14,300.

Example 8

Following the procedure described in Example 1, a mixture of 1.37 milliliters of an aqueous titanyl chloride solution (containing 219 grams) (Ti/l.), 10.2 milliliters of 85% syrupy orthophosphoric acid, and 13.4 milliliters of distilled water was sealed in a thick wall glass ampoule reactor. The actual concentration of the reactants in the resulting aqueous mixture was titanium, 0.25 molar, and phosphate, 6 molar.

The reactor and its contents were heated and agitated at 350° C. for about one hour followed by slow cooling to ambient temperature over a period of several hours. The product mixture was removed from the reactor; the solids were separated from the residual aqueous liquid by filtration and washed with water until the pH of the filtrate was about 3.5. A white finely divided particulate product was recovered after drying at about 103° C. under an absolute pressure of 1–2 mm. mercury. The yield of product was 1.06 grams.

Examination of the product by a light microscope at a magnification of 450× showed the product to be substantially thin, elongated, six-sided plates. The two long sides ranged from about 49 to about 80 microns, averaging about 60 microns, and the short sides ranged from about 10 microns to about 20 microns in length, averaging about 14 microns. The two terminal angles were 90°; the other four angles were 135°.

Elemental analysis by neutron activation analysis showed titanium, 24.2±0.6%, and phosphorus, 34.4±0.9%, indicating a molar Ti/P ratio of 0.46.

Example 9

Following the procedure described in Example 1, a mixture of 5.46 milliliters of an aqueous titanyl chloride solution (containing 219 grams Ti/l.), 13.65 ml. 85% syrupy orthophosphoric acid, and 5.88 ml. of distilled water was sealed in a thick wall glass ampoule reactor. The actual concentration of the reactants in the resulting aqueous mixture was titanium, 1 molar, and phosphate, 8 molar.

The reactor and its contents were heated and agitated at 350° C. for two hours followed by slow cooling to ambient temperature over a period of about 18 hours. The product mixture was removed from the reactor; the solids were separated from the residual aqueous liquid by filtration and washed with water until the pH of the filtrate was 4.1. The white solid was dried overnight at about 97° C. under an absolute pressure of 1–2 mm. mercury. The yield of finely divided particulate product was 4.61 grams.

Examination of the product by light microscopy at a magnification of 450× showed it to be substantially thin, elongated, six-sided plates. The two long sides ranged from about 30 microns to about 73 microns in length, averaging about 52 microns, and the short side ranged from about 5 microns to about 21 microns, averaging about 13 microns.

Titration of a slurry of the plates in 0.5 molar aqueous sodium chloride with dilute aqueous sodium hydroxide showed two acidic hydrogens. One was at about pH 4.9 and the other at about pH 7.6. The corresponding equivalent weights were 1540 and 7939 respectively.

Example 10

Following the procedure described in Example 3, a mixture of 0.40 gram of anatase $TiO_2$ and 10 milliliters of 5 molar aqueous orthophosphoric acid was sealed in a heavy wall glass ampoule reactor. This provided an aqueous reaction mixture having an initial concentration of titanium, 0.5 molar, and phosphate, 5 molar. The sealed reactor tube was heated with agitation for at about 400° C. for about one hour. After the reaction period the reactor was cooled slowly to ambient temperature. The product mixture was removed from the reactor, the solids separated by filtration and washed with distilled water until the pH of the wash filtrate was about 3.6. The solid product was dried at about 98° C. under an absolute pressure of about 1-2 millimeters of mercury. The yield of finely divided particulate product was 0.92 gram.

Examination of the white solid product particle by light microscopy at a magnification of 450× showed the product to be substantially elongated, thin, six-sided plate-lets. The two long sides ranged from about 25 microns to about 69 microns, averaging about 47 microns. The short sides ranged from about 5 microns to about 29 microns, averaging about 14 microns. The two terminal angles were 90°, and the other four angles were 135°.

Titration of a slurry of the plates in 0.5 molar aqueous sodium chloride with dilute aqueous sodium hydroxide revealed two acidic hydrogens, one at about pH 5.3 and the other at about pH 7.6. The breaks in the titration curves corresponded to a reaction of $9.24 \times 10^{-2}$ and $1.148 \times 10^{-1}$ meq. NaOH/gram plates respectively. These values correspond to equivalent weights of 10,800 and 44,600.

DEMONSTRATION OF UTILITY OF HEXAGONAL TITANIUM PHOSPHATE PLATELETS

Example 11

Composites consisting of small titanium phosphate small hexagonal platelets and various polymers were prepared and tested for physical properties. In these studies a polymer was dissolved in a suitable organic solvent, the amount of solvent being slightly in excess of that needed for complete dissolution of the polymer therein when the solvent was warm. The titanium phosphate was suspended in a second portion of the same solvent; sufficient solvent was used to give a titanium phosphate suspension of such viscosity that it could be poured easily. The suspension of titanium phosphate was thoroughly mixed with the polymer solution and the solvent was allowed to evaporate. The resulting viscous composite was heated in a vacuum over at 130° C. under an absolute pressure of less than one mm. Hg to remove the last traces of solvent. The resulting composite was compression molded at 400° F. in a mold between platens of dimension 8" by 8" under a pressure of 15,000 pounds. Flexural strengths and moduli were obtained according to ASTM test number D790-63 with the exception that the specimen width was ¼" and the Instron cross-head speed was 0.05 in./min.

Table I presents data for the various composites prepared and the physical properties of the resulting molded test specimens. For comparison, test data of molded polymer specimens which contained no titanium phosphate platelets (controls) also are presented in the table.

TABLE I

| | | Composition of test specimen | Results | |
|---|---|---|---|---|
| | Polymer | | Titanium phosphate platelets (wt. percent) | Flexural strength, K s.i.[1] | Flexural modulus, K s.i.[1] |
| Run No.: | | | | |
| 1 | Lucite 130 Polymethyl methacrylate | 10 | 11.95 | 4.85 |
| 1a | Do [2] | | 10.9 | 3.85 |
| 2 | Tybrene® 217 acrylonitrile butadiene styrene | 20 | 9.2 | 5.35 |
| 2a | Do [2] | | 7.5 | 3.2 |
| 3 | Styrene-maleic acid copolymer (25% maleic acid) | 5 | 9.0 | 5.8 |
| 3a | Do [2] | | 7.5 | 5.0 |
| 4 | Polyvinylchloride | 10 | 13.0 | 4.65 |
| 4a | Do [2] | | 8.1 | 2.3 |
| 5 | Derakane 114 vinyl ester resin | 20 | 21.6 | 6.4 |
| 5a | Do [2] | | 16.0 | 5.2 |
| 6 | Zerlon® 150 methyl methacrylate-styrene | 10 | | 5.4 |
| 6a | Do [2] | | | 4.6 |
| 7 | Do | 30 | | 7.6 |
| 8 | Do | 50 | | 10.85 |
| 9 | Tyril 760 acrylonitrile-styrene | 10 | | 5.95 |
| 9a | Do [2] | | | 4.9 |
| 10 | Do | 30 | | 8.25 |
| 11 | Do | 50 | | 12.6 |
| 12 | Acrylite H-11 polymethylmethacrylate | 10 | | 4.8 |
| 12a | Do [2] | | | 4.2 |
| 13 | Do | 30 | | 6.2 |
| 14 | Do | 50 | | 10.0 |
| 15 | Styron® 700 polystyrene | 10 | | 5.45 |
| 15a | Do [2] | | | 4.7 |
| 16 | Do | 30 | | 7.5 |
| 17 | Do | 50 | | 12.3 |

[1] K s.i.=1,000 lbs./sq. in.
[2] Control.

In a second study composites of polypropylene and large hexagonal titanium phosphate plates were prepared by the technique described directly hereinbefore. Modulus and elongation measurements were obtained following the standard ASTM Test No. D-1708, Speed C. The amount of the platelets used in the composite and test results obtained for the molded composite specimens are presented in Table II.

TABLE II

| | Large titanium phosphate plates (wt. percent in composite) | Modulus, K s.i. | Ultimate elongation, percent |
|---|---|---|---|
| Run No.: | | | |
| 1 | [1] 0 | 119 | 14.6 |
| 2 | 5 | 152 | 12.5 |
| 3 | 10 | 143 | 10.4 |
| 4 | 20 | 165 | 10.1 |
| 5 | 30 | 199 | 8.0 |
| 6 | 40 | 246 | 5.6 |

[1] Control.

Example 12

A number of tests were run to measure the reflectance of incident light at various wavelengths by small and intermediate platelets. In these studies, brightness measurements (indicative of reflectance of incident light) were taken using a Bausch and Lomb Spectronic 505 spectrometer. The instrument was calibrated using a barium sulfate standard. As a comparison and for control purposes, the reflectance of a commercially available spherical rutile pigment grade titanium also was measured.

The results of this study are summarized in Table III.

TABLE III

| Wavelength of incident light radiation (millimicrons) | Control TiO₂ [a], percent | Small titanium phosphate platelets, percent | | Intermediate titanium phosphate platelets [d], percent |
|---|---|---|---|---|
| | | Sample 1 [b] | Sample 2 [c] | |
| 600 | 98.2 | 100.2 | 99.9 | 97.1 |
| 500 | 97.2–96.3 | 99.9–98.2 | 98.2 | 95.1 |
| 450 | 96.1–96.2 | 99.2–98.2 | 98.2 | 94.0 |
| 430 | 94.8–95.1 | 99.3–98.2 | 98.3 | 93.8 |
| 415 | 84.4–87.4 | 99.3–98.0 | 98.3 | 92.2 |
| 410 | 74.9–79.1 | 97.9 | | 90.2 |
| 400 | 44.8–50.5 | 97.5 | | 81.7 |
| 380 | 8.6 | 94.7 | | |
| 360 | 4.5 | 90.9 | | |
| 350 | 4.2 | 87.9 | | |
| 330 | 4.3 | 72.5 | | |
| 310 | 4.3 | 49.4 | | |
| 300 | 4.3 | 28.5 | | |
| 280 | 3.3 | 2.0 | | |

[a] Dupont R–510, spherical rutile, about 0.25 micron diameter.
[b] About 0.2–0.4 microns in diameter.
[c] About 0.4–0.7 microns in diameter.
[d] About 8–15 microns in diameter.

Example 13

Small hexagonal platelets of titanium phosphate were used in paper coating compositions. The compositions along with a number of common paper coatings were evaluated for brightness in a standard brightness test.

In carrying out this study, a number of coating compositions were prepared having components in proportions as shown in Table IV. The values indicated for the various components are parts by weight; in the case of the solids, these are weights of wet solids used. Each of the final compositions contained a total of about 39–40 weight percent solids.

TABLE IV

| Component | Composition No., parts by weight | | | | | | | |
|---|---|---|---|---|---|---|---|---|
| | 1 | 2 | 3 | 4 | 5 | 6 | 7 | 8 |
| HT-clay (60% solids) | 166.5 | 133.5 | 133.5 | 133.5 | 100.0 | 66.6 | 33.3 | |
| Rutile TiO₂ (50% solids) | | 40 | | | | | | |
| Calcium carbonate (50% solids) | | | 40 | | | | | |
| Titanium phosphate (50% solids) | | | | 40 | 80 | 120 | 160 | 200 |
| Styrene-butadiene latex (48% solids) | 37.5 | 37.5 | 37.5 | 37.5 | 37.5 | 37.5 | 37.5 | 37.5 |
| Water | 91 | 84 | 84 | 84 | 72.5 | 70.9 | 64.2 | 57.5 |

Each of the blended coating compositions was applied with a No. 20 Meier rod onto Hammermill's Baronet Duplicator Paper having a weight of about 65 grams per square meter. After drying, the resulting coating weight ranged from about 18 to about 24 grams per square meter.

The photovolt brightness values of each of the dry coated (uncalendered) papers were measured using a TAPPI head and 457 millimicrons wavelength incident radiation. The relative brightness values exhibited by the coated papers are summarized in Table V.

TABLE V

| Coating composition number: | Relative brightness |
|---|---|
| Basepaper (control) | 83.0 |
| 1 | 77.5 |
| 2 | 81.0 |
| 3 | 79.5 |
| 4 | 82.0 |
| 5 | 85.5 |
| 6 | 88.0 |
| 7 | 91.5 |
| 8 | 92.5 |

Calendering of the papers did not change these values to any significant degree.

Various modifications can be made in the present invention without departing from the spirit or scope thereof for it is understood that I limit myself only as defined in the appended claims.

What is claimed is:

1. A crystalline hexagonal titanium phosphate platelet possessing acidic hydrogen and having a thickness of less than about 5 microns and a Ti/P molar ratio of from about 0.3 to about 0.95.

2. The platelet as defined in claim 1 having substantially equal length sides, a diameter of about 0.5 micron and a thickness of about 0.1–0.2 micron.

3. The platelet as defined in claim 1 having substantially equal length sides, and a diameter of from about 10 to about 15 microns.

4. The platelet as defined in claim 1 having two parallel sides averaging about 50 microns in length and the other four sides averaging about 20 microns in length.

5. A process comprising:
   (a) mixing an aqueous solution of orthophosphoric acid or of a soluble inorganic phosphate with a titanium source material soluble therein to provide a reaction mixture having an initial titanium concentration, expressed as titanium ion of from 0.13 to 1 molar and a phosphate concentration, expressed as $PO_4\equiv$ ion, of from about 3 to 5 molar,
   (b) heating said reaction mixture under at least its autogenous pressure at a temperature of from about 100 to 225° C. for a period of from 0.25 to 4 hours thereby to prepare hexagonal platelets having substantially equal length sides, a diameter of about 0.5 micron and a thickness of about 0.1–0.2 micron, and
   (c) separating the platelets from the residual aqueous reaction mixture.

6. A process as in claim 5 where separation of platelets from the residual aqueous reaction mixture is carried out by filtration.

7. A process comprising:
   (a) mixing an aqueous solution of orthophosphoric acid or of a soluble inorganic phosphate with a member of the groups consisting of anatase or rutile titanium dioxide or an amorphous or crystalline titanium phosphate and adding also a finely divided titanium phosphate nucleating agent, thereby to provide a reaction mixture having an initial titanium concentration, expressed as titanium ion, of from about 0.25 to 1 molar and a phosphate concentration, expressed as $PO_4\equiv$ ion, of from about 3 to 4.5 molar, and a seed concentration of from about 0.125 to about 1.0 weight percent of the total calculated titanium phosphate platelet product,
   (b) heating said reaction mixture under at least its autogenous pressure at a temperature of from about 150 to 225° C. for a period of from 1 to 5 hours thereby to prepare hexagonal platelets having substantially equal length sides, a diameter of from about 10 to about 15 microns and a thickness of less than about 5 microns, and
   (c) separating the platelets from the residual aqueous reaction mixture.

8. A process as in claim 7 where separation of platelets from the residual aqueous reaction mixture is carried out by filtration.

9. A process comprising:
   (a) mixing an aqueous solution of orthophosphoric acid or of a soluble inorganic phosphate with a titanium source material to provide a reaction mixture having an initial titanium concentration, expressed as titanium ion of from 0.13 to 1 molar and a phosphate concentration expressed as $PO_4^{\equiv}$ ion, of from about 5 to 8 molar, (b) heating said reaction mixture under at least its autogenous pressure at a temperature of from about 300 to 400° C. for a period of from 1 to 24 hours thereby to prepare hexagonal platelets having two parallel sides averaging about 50 microns in length and the other four sides averaging about 20 microns in length and a thickness of less than about 5 microns, and (c) separating the platelets from the residual aqueous reaction mixture.

10. A process as in claim 9 where separation of platelets from the residual aqueous reaction mixture is carried out by filtration.

References Cited
UNITED STATES PATENTS 2,772,244   11/1956   Shaltt et al. _____ 252—437

FOREIGN PATENTS 725,091   1/1966   Canada _____ 23—105

OSCAR R. VERTIZ, Primary Examiner

G. A. HELLER, Assistant Examiner

U.S. Cl. X.R.

106—299; 260—37, 41